US007080002B1

United States Patent
Kim (10) Patent No.: US 7,080,002 B1
(45) Date of Patent: Jul. 18, 2006

(54) BI-LINGUAL SYSTEM AND METHOD FOR AUTOMATICALLY CONVERTING ONE LANGUAGE INTO ANOTHER LANGUAGE

(75) Inventor: Jae-Oh Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/048,337

(22) Filed: Mar. 26, 1998

(30) Foreign Application Priority Data

Mar. 26, 1997 (KR) ................................. 97/10419

(51) Int. Cl.
*G06F 17/28* (2006.01)

(52) U.S. Cl. .............................. 704/2; 704/8; 704/257; 704/231

(58) Field of Classification Search .................... 704/1, 704/2–9, 231, 257; 707/535, 534; 382/185; 400/110, 109, 484; 341/28, 22; 345/171
See application file for complete search history.

(56) References Cited

U.S. PATENT DOCUMENTS

| | | | |
|---|---|---|---|
| 4,124,843 A | 11/1978 | Bramson et al. | 707/535 |
| 4,443,856 A | 4/1984 | Hashimoto et al. | 704/2 |
| 4,484,305 A | 11/1984 | Ho | 707/535 |
| 4,654,798 A | 3/1987 | Taki et al. | 704/3 |
| 4,984,177 A | 1/1991 | Rondel et al. | 704/277 |
| 5,047,932 A | 9/1991 | Hsieh | 707/535 |
| 5,091,950 A | 2/1992 | Ahmed | 704/3 |
| 5,127,748 A | 7/1992 | Okimoto et al. | 707/535 |
| 5,384,701 A | 1/1995 | Stentiford et al. | 704/277 |
| 5,477,451 A | 12/1995 | Brown et al. | 704/9 |
| 5,526,259 A | 6/1996 | Kaji | 704/3 |
| 5,623,682 A | 4/1997 | Fukunaga | 707/536 |

*Primary Examiner*—Richemond Dorvil
*Assistant Examiner*—Lamont Spooner
(74) *Attorney, Agent, or Firm*—Robert E. Bushnell, Esq.

(57) ABSTRACT

A bi-lingual conversion system and method which automatically converts an unrecognizable character stream of one language into another language based on the respective list rule and the pronunciation rule. The bi-lingual conversion method includes storing an incoming character stream in a memory; determining whether the character stream agrees with a respective list rule when a space command is detected in the character stream, and an automatic conversion mode is selected; and converting the character stream into a corresponding character stream of a complementary language according to a pronunciation rule of the respective language when the character stream does not agree with the list rule for providing a faster and more accurate language conversion.

8 Claims, 6 Drawing Sheets

BI-LINGUAL SYSTEM AND METHOD FOR AUTOMATICALLY CONVERTING ONE LANGUAGE INTO ANOTHER LANGUAGE

CLAIM FOR PRIORITY

This application makes reference to, incorporates the same herein, and claims all benefits accruing under 35 U.S.C. § 119 from an application for BI-LINGUAL SYSTEM AND METHOD FOR AUTOMATICALLY CONVERTING ONE LANGUAGE INTO ANOTHER LANGUAGE earlier filed in the Korean Industrial Property Office on the 26$^{th}$ of March 1997, and there duly assigned Serial No. 10419/1997, a copy of which application is annexed hereto.

BACKGROUND OF THE INVENTION

1. Technical Field

The present invention relates to a bi-lingual system for automatically converting a character stream of one language into a character stream of another language, and more particularly, to an automatic character converting system in a bi-lingual word processor using a list method and a pronunciation method to obtain highly accurate conversion of one language into another language.

2. Related Art

Computer systems have become increasingly sophisticated and powerful as a result of increases in processing speed and memory capacity. More attention has been given to using computer systems, and particularly, word processors to convert written words from one language to another. Contemporary efforts to translate one language to another are disclosed, for example, U.S. Pat. No. 4,484,305 for Phonetic Multilingual Word Processor issued to Ho, U.S. Pat. No. 4,443,856 for Electronic Translator For Modifying And Speaking Out Sentence issued to Hashimoto et al., U.S. Pat. No. 4,654,798 for System Of Simultaneous Translation Into A Plurality Of Languages With Sentence Forming Capabilities issued to Taki et al., U.S. Pat. No. 5,091,950 for Arabic Language Translating Device With Pronunciation Capability Using Language Pronunciation Rules issued to Ahmed, U.S. Pat. No. 5,127,748 for Documentation System Having Multilingual Function issued to Okimoto et al., U.S. Pat. No. 5,384,701 for Language Translation System issued to Stentiford et al., U.S. Pat. No. 5,477,451 for Method And System For Natural Language Translation issued to Brown et al., U.S. Pat. No. 5,623,682 for Apparatus For Processing Documentary Information issued to Fukunaga.

A computer system for executing word processing typically has data inputting, data processing, and data outputting capabilities. Word processors consist a variety of capabilities, such as automatic character converting and spell checking. Generally, automatic character conversion relates to a process for converting a character stream of one language into that of another language while working with a bilingual word processor. Although a bilingual conversion system may be used to convert any combination of two languages, for the purposes of this discussion, the combination of Korean/English languages is described.

First of all the automatic conversion method is used to convert an unrecognizable character stream of one language into another language. When a stream of character is input to form a word, the word should have a proper character stream such that an initial sound should precede a middle sound which should be followed by a final sound. Consequently, when an incorrect order of sounds is detected, the automatic conversion system automatically switches the word into other language (Korean to English or vice versa). Another method is to allow the user to define the placement of the automatic conversion. Therefore, when an unrecognizable character stream of one language is input, the user defines the placement of the unrecognizable character stream to be converted automatically into another language. Since such a method can be controlled by the user, the accuracy of conversion tends to be very high. However, I have observed that both methods have drawbacks. Since the automata method converts words based on a recognizable character stream, when a bi-lingual word or a character stream that has consecutive vowels or consonants is input, the character conversion cannot be accurately performed, particularly when the consecutive words, consonants or vowels are escaped from the combination rule. Specifically, when a consecutive vowels or consonants is input, such character stream will be converted into another language, even though such character stream may signify something else.

SUMMARY OF THE INVENTION

Accordingly, it is therefore an object of the present invention to provide a reliable language conversion system for a word processor to convert a character stream of one language into another language.

It is also an object to provide an automatic Korean-English conversion system for a word processor of a computer system for converting an unrecognizable character stream of one language into another language according to a list rule and a pronunciation rule of the character stream of respective language.

It is yet another object to provide an automatic conversion system for a word processor of a computer system for storing an input character stream of one language into a memory, determining whether the input character stream agrees with a list rule when the character stream contains a space and an automatic conversion mode is selected, and then converting the character stream according to a pronunciation rule when the character stream does not agree with the list rule.

These and other objects of the present invention can be achieved by a bi-lingual conversion system for automatically converting a first language into a second language different from said first language which comprises a memory for storing an incoming character stream of the first language; and a controller for determining whether an automatic conversion mode is selected by a user, and determining whether the character stream agrees with a respective list rule when a space command is detected in the character stream and the automatic conversion mode is selected by the user, and for converting the character stream into a corresponding character stream of the second language according to a pronunciation rule of the respective language when the character stream does not agree with the list rule. The first language corresponds to Korean, and the second language corresponds to English. The controller seeks to convert a Korean character stream into English when the Korean character stream does not agree with the Korean pronunciation rule, convert an English character stream into Korean when the English character stream does not agree with the Korean pronunciation rule, and convert a bi-lingual character stream of Korean and English according to the predetermined priority order.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
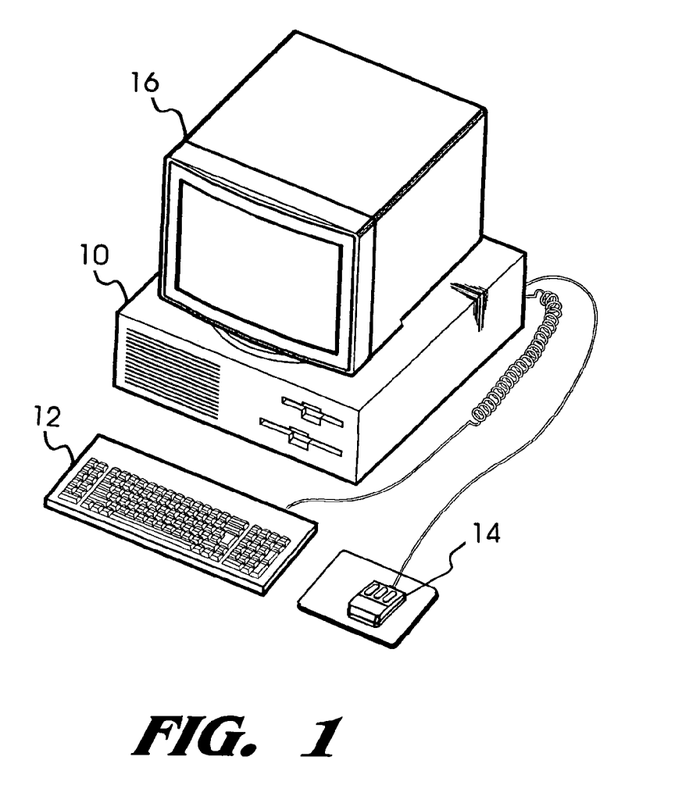
FIG. 1 is a schematically perspective view of a computer system.
Figure 2:
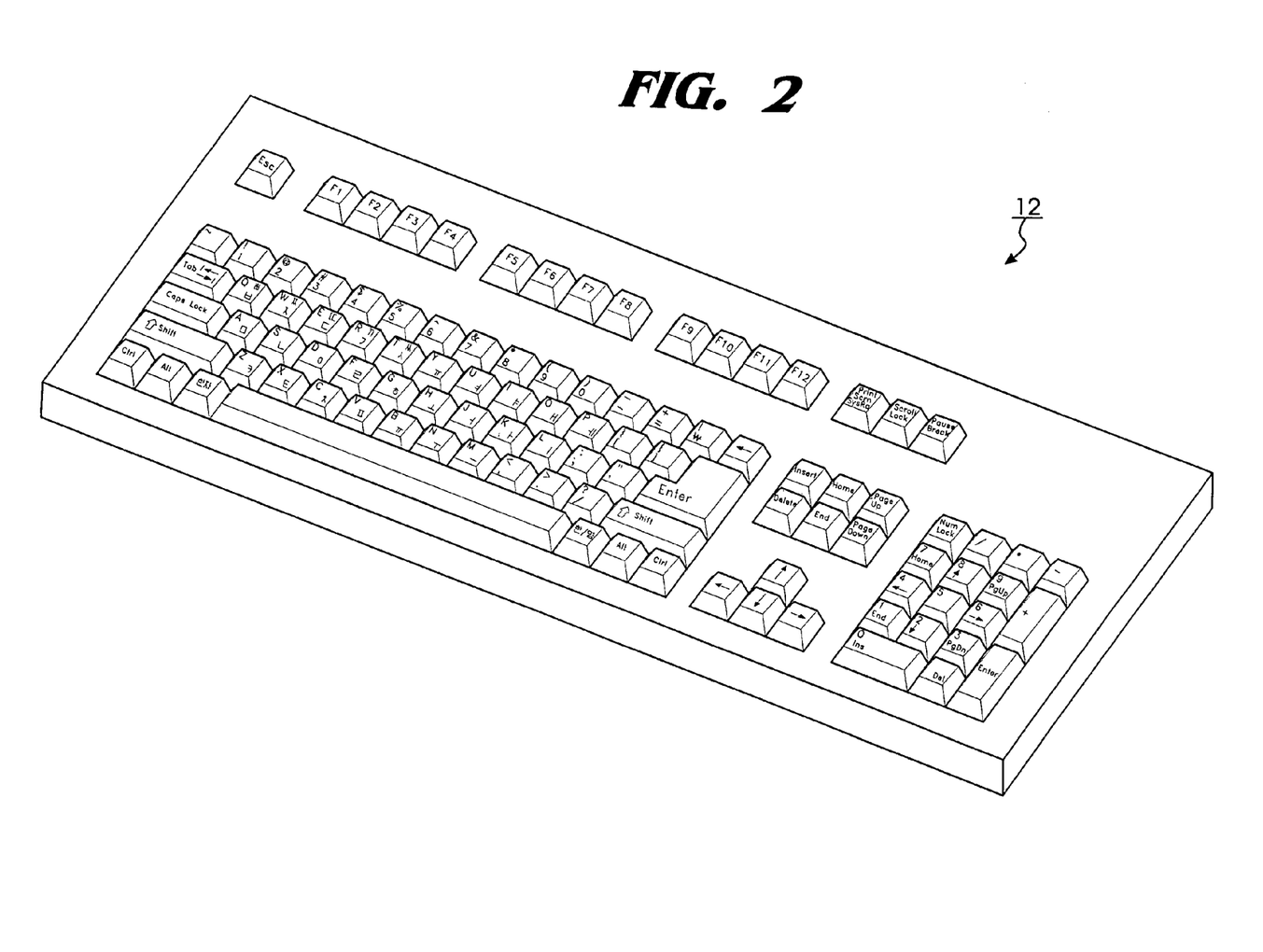
FIG. 2 is a perspective view of a keyboard of the computer system using Korean/English keys.

Referring now to the drawings and particularly to FIG. 1, which illustrates a computer system using a word processor which is a software for executing word processing, creating and editing a document. As shown in FIG. 1, the computer system includes a main body 10, input devices such as a keyboard 12 and a mouse 14, and a display unit 16 such as a monitor. The keyboard 12 is a bi-lingual type as shown in FIG. 2 including the usual function keys, numerical keys, space keys, and a plurality of input keys having first language (English) inscriptions respectively inscribed thereon and second language (Korean) inscriptions respectively inscribed thereon corresponding to the first language (English) inscriptions.

Figure 3:
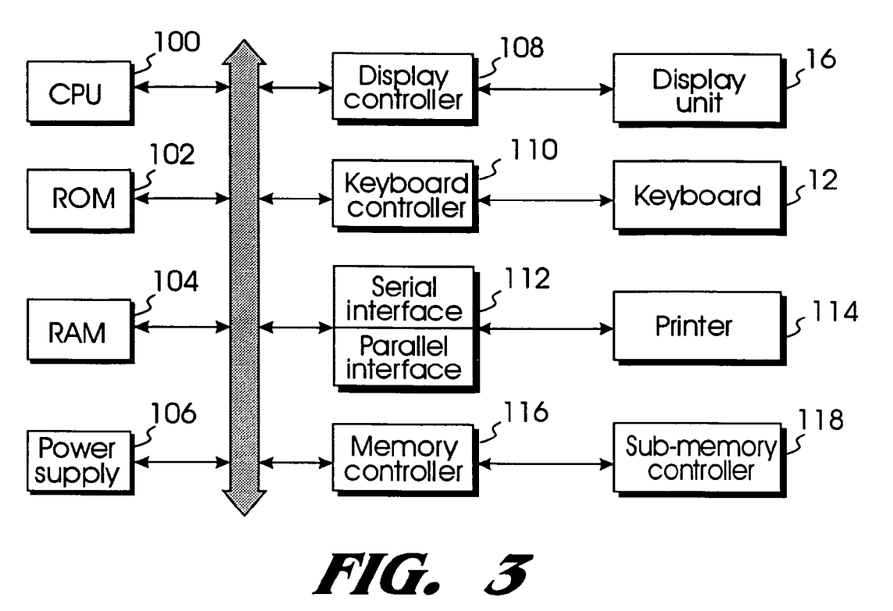
FIG. 3 is a block diagram of the computer system as shown in FIG. 1.

FIG. 3 illustrates a block diagram of the computer system which includes a central processing unit (CPU) 100, a read-only-memory (ROM) 102, a random-access-memory (RAM) 104, power supply 106, a display controller 108 for controlling communication with the display unit 16, a keyboard controller 110 for controlling communication with the keyboard 12, a serial interface and parallel interface 112 for controlling operation of a printer 114, a memory controller 116, and a sub-memory controller 118.

Figure 4:
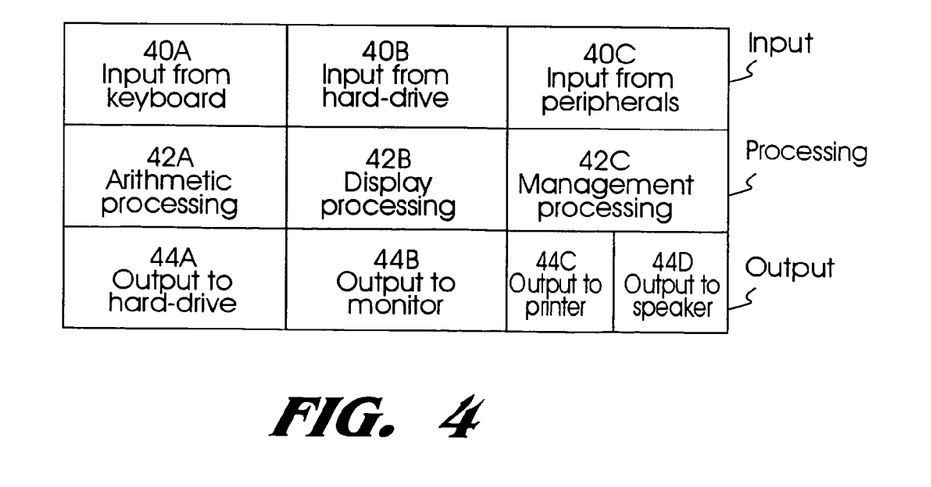
FIG. 4 is a functional diagram of the computer system as shown in FIG. 1.

The keyboard 12 is connected through the keyboard controller 110 and a common bus to the CPU 110. The CPU 110 is also connected through the common bus to ROM 102, RAM 104, display unit 16 via the display controller 108, the printer 114 via the serial and parallel interface 112, and the memory controller 116. The ROM 102 includes a program memory storing various control programs for controlling the computer system. The RAM 104 includes various buffer memories for storing different keyboard modes. Generally, such a computer system has capabilities of data inputting such as input from keyboard 40A, input from hard drive 40B, input from peripherals 40C, data processing such as arithmetic processing 42A, display processing 42B, data management processing 42C, and data outputting such as output to hard drive 44A, output to monitor 44B, output to printer 44C as shown in FIG. 4.

Word processors which are software for creating and editing a document for the computer system, generally consist a variety of capabilities, such as automatic character converting and spell checking. Generally, the automatic character conversion function relates to a process for converting a character stream of one language into that of another language. The bi-lingual conversion function is added to the existing word processor software, which is known as a bi-lingual conversion system. While the bi-lingual conversion system may incorporate any combination of two languages, for the purpose of the preferred embodiments, the combination of Korean and English language is discussed hereinbelow.

First of all, an automatic conversion method is used to convert an unrecognizable character stream of one language into another language. When a stream of character is input to form a word, the word should have a proper character stream such that an initial sound should precede a middle sound which should be followed by a final sound. Consequently, when an incorrect order of sounds is detected, the automatic conversion system automatically switches the word into other language (Korean to English or vice versa). For example, when a Korean word 잠 is to be input via a keyboard 12 as shown in FIG. 2, the word contains a character stream of the initial sound ㄴ, the middle sound ㅐ, and the final sound ㅋ. On the other hand, if ㄴㅁㅍㄷ, which has no meaning in Korean (four consecutive consonants), is input via the keyboard 12, then the conversion system will automatically convert the above Korean characters into the corresponding English characters. As a result, the English word "save" will be output for a visual display on the monitor 16.

Figure 5:
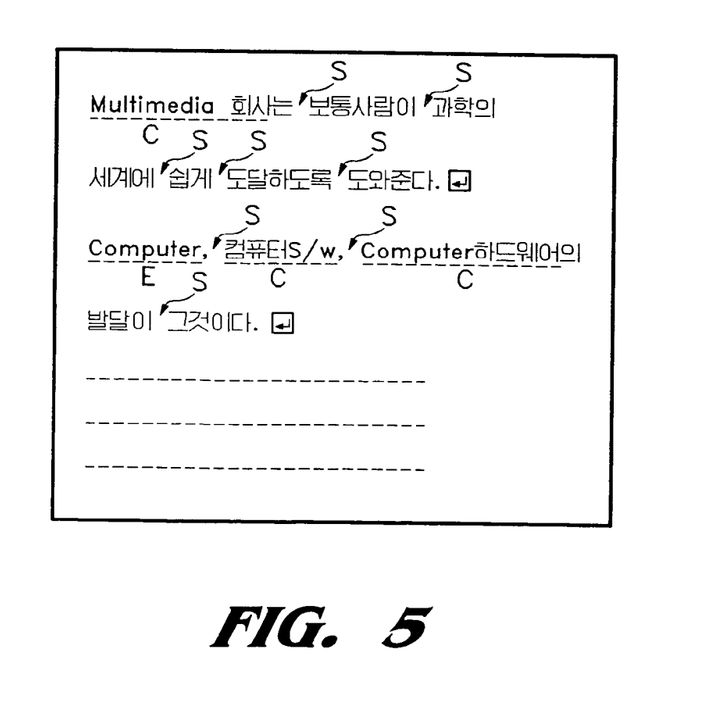
FIG. 5 illustrates a visual display of a document containing English and Korean words, and words combining both English and Korean languages.

Another method is to allow the user to define the placement of the automatic conversion. Therefore, when an unrecognizable character stream of one language is input, the user defines the placement of the unrecognizable character stream to be converted automatically into another language. Since such a method can be controlled by the user, the accuracy of conversion tends to be very high. However, according to the automata method, even if a bilingual word made of Korean and English is input via the keyboard 12, as illustrated in FIG. 5 (웜 터S/W), the automata method converts the whole word into one language. In other words, when the user tries to input "웜 터S/W"while using such key board as illustrated in FIG. 2 oriented in English, the user has to type "zjavbxj", then the system automatically changes the word into Korean. However, "S/W", which should not be converted, must be included in the word. When "S/W" is inputted along with "zjavbxj," then "S/W" will be converted into the corresponding Korean letters as well. The second method as described incorporates the automata method such that conversion is executed in a very similar manner.

Both methods, as I have noted, have more drawbacks. Since the automata method converts words based on a recognizable character stream, when a bi-lingual word or a character stream that has consecutive vowels or consonants is inputted, conversion becomes inaccurate. Specifically, when a consecutive vowels or consonants is input via the keyboard 12, such character stream will be converted into another language, even though such character stream may signify something else. For example, when "ㄱㄴㄷㄹ"(The first four letters of the Korean alphabet) is input via the keyboard 12 for signifying an order, the bi-lingual conversion system will automatically convert the characters into "rsef." In other words, since the character stream, which has four consecutive consonants, does not match the order of sounds (a pronunciation rule), the bi-lingual conversion system automatically will convert the character stream into the corresponding English-key letters.

Figure 6:
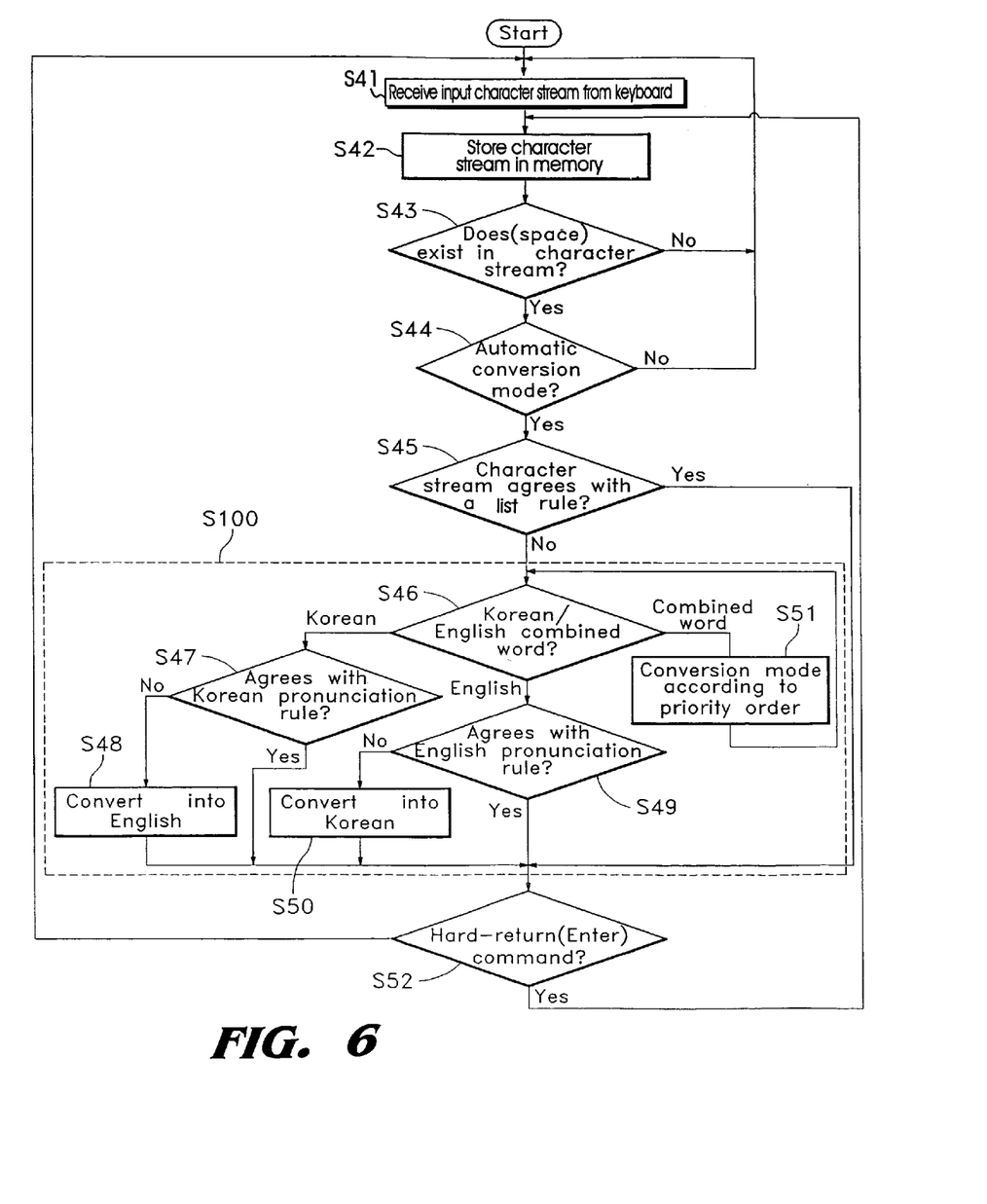
FIG. 6 illustrates an automatic Korean/English conversion method according to the principles of the present invention.

Turning now to FIG. 6 which illustrates an automatic Korean/English conversion method of a word processor according to the principles of the present invention. Generally, the automatic Korean/English conversion method includes receiving a character stream input through the keyboard 12 by the user for storage in a memory, determining whether the character stream agrees with a list rule when a space bar is entered and an automatic conversion mode has been selected, and then converting the character stream of one language into a corresponding character stream of another language according to a pronunciation rule when the character stream does not agree with the list rule. That is, a Korean character stream is converted into a corresponding English character stream when the character stream is in Korean and the Korean character stream does not agree with the Korean pronunciation rule. Likewise, an English character stream is converted into a corresponding Korean character stream when the character stream is in English and the English character stream does not agree with the English pronunciation rule. If an input character stream contains both Korean and English characters, the bi-lingual character stream (English/ Korean) is converted according to a priority order.

The automatic conversion of characters is performed according to a list rule and a pronunciation rule of the character stream. The list rule pertains to the order of characters in Korean and English. For example, the list rule means that the order of ㄱ, ㄴ, ㄷ, ㄹ, ㅁ in Korean, and a, b, c, d e, etc. . . . in English. If the input character stream in Korean is ㅅㅏㅂㅜ, the conversion word will be "save" in English. The pronunciation rule of the character stream means that the characters are pronounced and connected with an initial sound, a medial sound and a final consonant mutually in Korean and (a) consonant(s) and (a) vowel(s) mutually in English.

Figure 7:
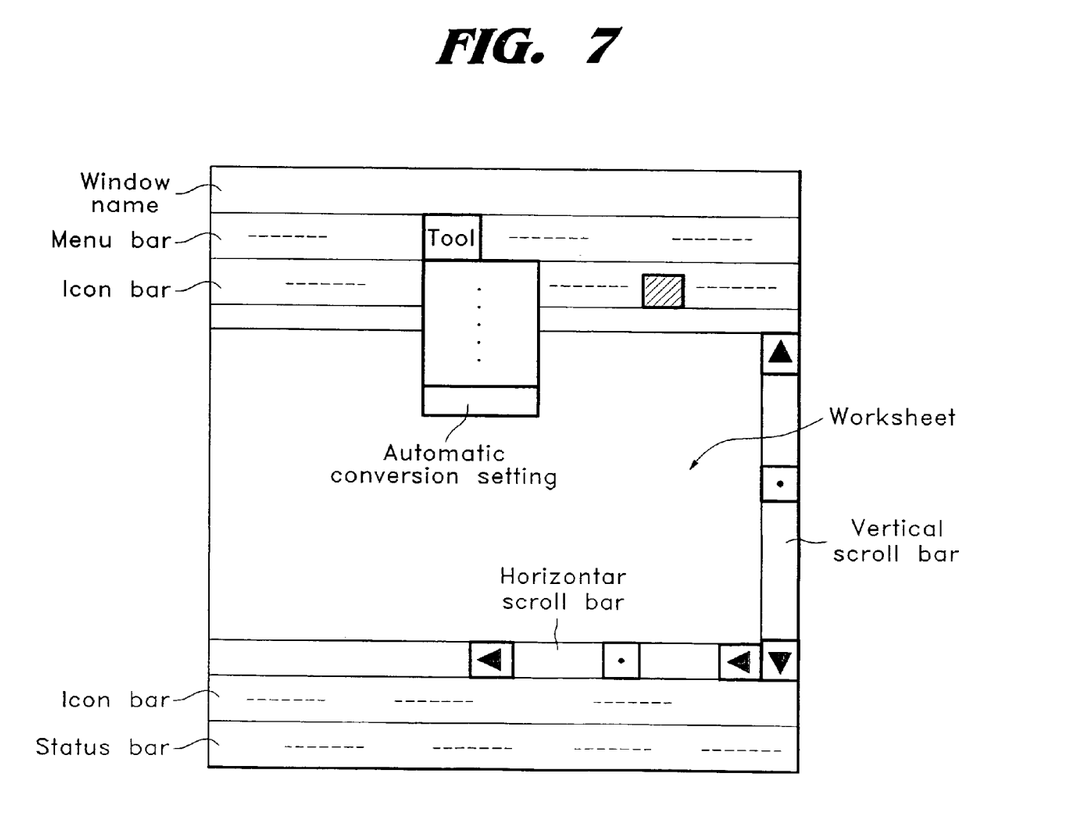
FIG. 7 illustrates a typical worksheet of a word processor.

FIG. 7 illustrates a schematic view of a typical worksheet of a word processor displayed on the display unit 16 of the computer system. For each worksheet in a window, an automatic conversion setting, a window name, a menu bar, icon bars, a status bar, a vertical scroll bar, and a horizontal scroll bar are illustrated to permit the user to set the automatic bi-language conversion system in motion.

Figure 8:
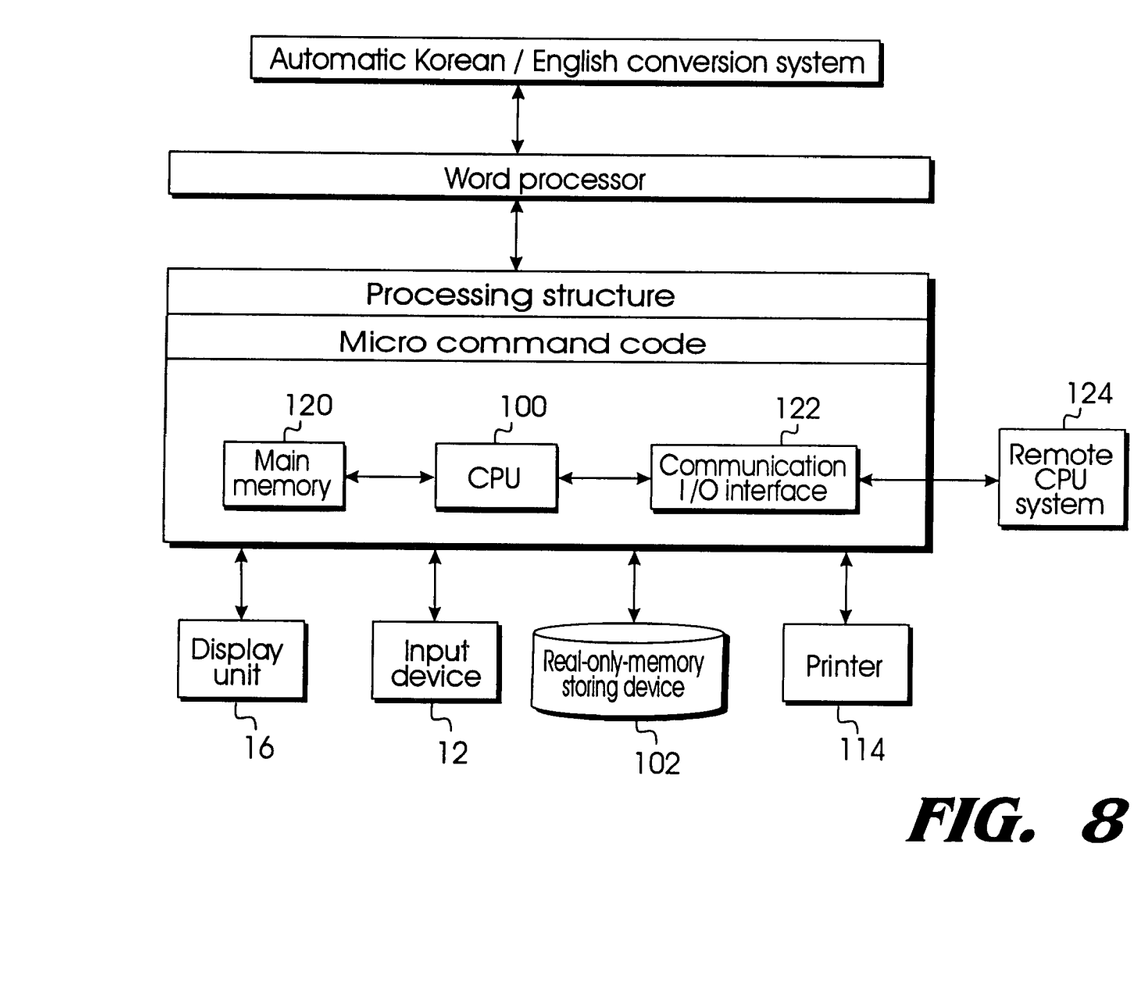
FIG. 8 is a block diagram of the computer system used for executing the automatic Korean/English conversion method according to the principles of the present invention.

FIG. 8 is a block diagram of the computer system used for executing the automatic bi-lingual (Korean/English) conversion system according to the principles of the present invention. The automatic Korean/English conversion system is a software having a Korean-English conversion function implemented to the existing word processor software with processing structure and micro command code. The CPU 100 is connected to the main memory 120, the communication I/P interface 122 which interfaces with a remote CPU system 124, for controlling operations of the display unit 16, the input device 12, the ROM 102, and the printer 114.

Now, the automatic Korean/English conversion method according to the present invention will be described in detail with reference to FIG. 6 hereinbelow.

First of all, a character stream which is input via the keyboard 12 by the user is received at step S41 and then stored in a memory at step S42. The bi-lingual conversion system then determines whether the character stream stored in the memory contains any space therein at S43. When the character stream stored in the memory contains no space therebetween, then the characters are continuously received through the keyboard 12 at step S41. However, when the character stream stored in the memory contains a space therebetween, then the bi-lingual conversion system determines whether an automatic conversion mode has been selected by the user through a menu bar as illustrated in FIG. 6 at step S44.

When the automatic conversion mode has not been selected by the user through the menu bar, the bi-lingual conversion system continues to receive characters without making any conversion at S41. However, when the automatic conversion mode has been selected by the user through the menu bar, then the bi-lingual conversion system determines whether the character stream agrees with a list rule at step S45.

When the character stream agrees with the list rule at step S45, then the bi-lingual conversion system proceeds to step S52 for detecting a hard-returned command (Enter key). On the other hand, when the character stream does not agree with the list rule at step S45, then the bi-lingual conversion system performs the conversion according to a pronunciation rule at step S100.

The following describes step S100 in more specific detail. First of all, the bi-lingual conversion system determines whether an incoming character stream is either Korean, English, or a bi-lingual Korean-English word at S46. If the character stream is Korean, then the bi-lingual conversion system determines whether the Korean character stream agrees with the Korean pronunciation rule at S47. When the Korean character stream does not agree with the Korean pronunciation rule, then the bi-lingual conversion system automatically converts the Korean character stream into a corresponding English character stream to produce a correct English word at S48.

On the other hand, if the character stream is English, then the bi-lingual conversion system determines whether the English character stream agrees with the English pronunciation rule at step S49. When the English character stream does not agree with the English pronunciation rule, then the bi-lingual conversion system automatically converts the English character stream into a corresponding Korean character stream to produce a correct Korean word at step S50.

Finally, if the incoming character stream is a combined word of both Korean-English, such a character stream is converted according to a predetermined priority order at step S51. Subsequently, the bi-lingual conversion system returns to step S46 to repeat the language conversion. For example, if a bi-lingual word is made of English followed by Korean characters, when determined that such character stream does not apply to the list rule, then the bi-lingual conversion system will convert the word into English. On the other hand, if a bi-lingual word is made of Korean followed by English characters, when determined that such character stream does not apply to the list rule, then the bi-lingual conversion system will convert the word into Korean.

When determined that the incoming character stream agrees with the respective pronunciation rule, then the bi-lingual conversion system directly proceeds to step S52 to detect a hard-return command. When a hard-return command is detected, the bi-lingual conversion system returns to step 42 for storing the hard-return command in the memory. However, when there is no hard-return command, the bilingual conversion system returns to step 41 for repeating the whole process from the beginning.

As described above, a bi-lingual conversion system of the present invention automatically converts an unrecognizable character stream into other language according to a list rule and a pronunciation rule of the respective language. As a result, a more efficient and accurate conversion system can be incorporated in a word processor.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. For example, the automatic conversion can be made in many combinations, such as Korean/Japanese, Korean/French, and Korean/Chinese etc. Therefore, it is intended that the present invention not be limited to the particular embodiment disclosed as the best mode contemplated for carrying out the present invention, but that the present invention includes all embodiments falling within the scope of the appended claims.

What is claimed is:

1. A bi-lingual conversion system for automatically converting a message in a first language into a message in a second language, said system comprising:
    a computer memory for storing an incoming character stream of said first language;
    a first controller providing a first signal indicative of whether each of the following conditions has been satisfied: (a) an automatic conversion mode has been selected by a user, (b) a space command has been detected in said incoming character stream, and (c) said incoming character stream agrees with a pronunciation rule of the first language; and
    a second controller, coupled to said first controller and operating in response to receipt of said first signal, converting said incoming character stream into a character stream of said second language according to a pronunciation rule of the second language when said character stream does not agree with said pronunciation rule of the first language.

2. The bi-lingual conversion system of claim 1, wherein said first language is Korean, said second language is English, the pronunciation rule of the first language is a Korean pronunciation rule, and the pronunciation rule of the second language is an English pronunciation rule.

3. The bi-lingual conversion system of claim 2, wherein said second controller is adapted for:
    converting a Korean character stream into English when said Korean character stream does not agree with the Korean pronunciation rule;
    converting an English character stream into Korean when said English character stream does not agree with the English pronunciation rule; and
    converting a bi-lingual character stream of Korean and English according to a predetermined priority order.

4. The bi-lingual conversion system of claim 1, wherein said first language is English, said second language is Korean, the pronunciation rule of the first language is an English pronunciation rule, and the pronunciation rule of the second language is a Korean pronunciation rule.

5. A bi-lingual conversion method for automatically converting a message in a first language into a message in a second language, said method comprising the steps of:
    (1) storing in a computer-readable memory an incoming character stream of a message in a first language;
    (2) reading said character stream until a space command is detected in said incoming character stream;
    (3) when a space command is detected in said incoming character stream, and an automatic conversion mode has been user-selected, determining whether said incoming character stream agrees with a pronunciation rule for the first language;
    (4) when said incoming character stream does not agree with said pronunciation rule, making a conversion of said incoming character stream into a character stream of a second language according to a pronunciation rule of the second language.

6. The method of claim 5, comprised of a further step after step (4), said further step comprising: when said incoming character stream is a bi-language character stream of a first language and a second language, converting the bi-language character stream into a second character stream according to a predetermined priority order.

7. The method of claim 5, adapted for use with an English pronunciation rule and a Korean pronunciation rule, wherein said conversion of said incoming character stream comprises:
    (a) converting a Korean character stream into English when said Korean character stream does not agree with the Korean pronunciation rule;
    (b) converting an English character stream into Korean when said English character stream does not agree with the English pronunciation rule; and
    (c) converting a bi-lingual character stream according to a predetermined priority order.

8. The method of claim 7 wherein, after the bi-lingual character stream has been converted according to a predetermined priority order:
    (i) when the bi-lingual character stream has been converted into English, whereby an English-converted character stream is provided, a determination is made of whether said English-converted character stream agrees when the English pronunciation rule, and if said English-converted character stream does not agree with the English pronunciation rule, the bi-lingual character stream is converted into Korean; and
    (ii) when the bi-lingual character stream has been converted into Korean, whereby a Korean-converted character stream is provided, a determination is made of whether said Korean-converted character stream agrees with the Korean pronunciation rule, and when said Korean-converted character stream does not agree with the Korean pronunciation rule, the bi-lingual character stream is converted into English.

* * * * *